United States Patent [19]

Yatka et al.

[11] Patent Number: 5,637,334

[45] Date of Patent: Jun. 10, 1997

[54] CHEWING GUM CONTAINING MALTITOL

[75] Inventors: Robert J. Yatka, Orland Park; Lindell C. Richey, Lake Zurich, both of Ill.; Marc A. Meyers, Sparta, N.J.; David L. Witkewitz, Bridgeview, Ill.

[73] Assignee: Wm. Wrigley Jr. Company, Chicago, Ill.

[21] Appl. No.: 454,112

[22] PCT Filed: Sep. 30, 1993

[86] PCT No.: PCT/US93/09352

§ 371 Date: Sep. 26, 1995

§ 102(e) Date: Sep. 26, 1995

[87] PCT Pub. No.: WO95/08924

PCT Pub. Date: Apr. 6, 1995

[51] Int. Cl.⁶ ........................................... A23G 3/30
[52] U.S. Cl. ........................... 426/3; 426/658; 426/804
[58] Field of Search ................................. 426/3–6, 804, 426/658

[56] References Cited

U.S. PATENT DOCUMENTS

| | | |
|---|---|---|
| 3,741,776 | 6/1973 | Mitsuhashi et al. . |
| 3,915,736 | 10/1975 | Oyamada et al. . |
| 3,918,986 | 11/1975 | Hiraiwa . |
| 4,217,368 | 8/1980 | Witzel et al. . |
| 4,238,475 | 12/1980 | Witzel et al. . |
| 4,248,895 | 2/1981 | Stroz et al. . |
| 4,252,830 | 2/1981 | Kehoe et al. . |
| 4,408,041 | 10/1983 | Hirao et al. . |
| 4,471,001 | 9/1984 | Lynch . |
| 4,508,713 | 4/1985 | Stroz et al. . |
| 4,514,422 | 4/1985 | Yang et al. . |
| 4,556,565 | 12/1985 | Arima et al. . |
| 4,623,543 | 11/1986 | Motegi et al. . |
| 4,671,961 | 6/1987 | Patel et al. . |
| 4,671,967 | 6/1987 | Patel et al. . |
| 4,717,765 | 1/1988 | Hirao et al. . |
| 4,725,387 | 2/1988 | Hirao et al. . |
| 4,728,515 | 3/1988 | Patel et al. . |
| 4,753,806 | 6/1988 | Carroll et al. . |
| 4,770,889 | 9/1988 | Sakai et al. . |
| 4,774,094 | 9/1988 | Carroll et al. . |
| 4,789,559 | 12/1988 | Hirao et al. . |
| 4,792,453 | 12/1988 | Reed et al. . |
| 4,840,797 | 6/1989 | Boursier . |
| 4,933,188 | 6/1990 | Cherukuri et al. . |
| 4,933,189 | 6/1990 | Cherukuri et al. . |
| 4,959,225 | 9/1990 | Wong et al. . |
| 5,017,400 | 5/1991 | Olinger et al. . |
| 5,110,608 | 5/1992 | Cherukuri et al. . |
| 5,120,551 | 6/1992 | Yatka et al. . |
| 5,144,024 | 9/1992 | Pepper et al. . |
| 5,320,854 | 6/1994 | Dave et al. . |

FOREIGN PATENT DOCUMENTS

| | | |
|---|---|---|
| 0 201 412 A1 | 11/1986 | European Pat. Off. . |
| 0 325 090 A2 | 7/1989 | European Pat. Off. . |
| 0 376 468 | 7/1990 | European Pat. Off. . |
| 0 390 299 A1 | 10/1990 | European Pat. Off. . |
| 0 664 960 A1 | 2/1995 | European Pat. Off. . |
| 1183306 | 10/1987 | Italy . |
| 49-32067 | 8/1974 | Japan . |
| 53-127858 | 11/1978 | Japan . |
| 6-133697 | 5/1994 | Japan . |
| WO95/08924 | 4/1995 | WIPO . |
| WO95/08927 | 4/1995 | WIPO . |

OTHER PUBLICATIONS

Article entitled "Maltitol In Powder Form From Reduction of Matose," by Aoki Ikuo, published in New Food Industry, (1982), 24, No. 11, pp. 14–19.

Article entitled "Sugar–Less Chewing Gum Based on Maltitol," by Takashi Maruyama, published in Shokuhin Kogyo (1984), 27, pp. 73–80.

Article entitled "Towa Stressing Sales of Maltitol Powder" published in Japan Chemical Week, Mar. 28, 1985, p. 3.

Article entitled "Lycasin for confections," by Yves LeBot, published in The Manufacturing Confectioner (1983), pp. 69–74.

Brochure entitled "Polyols: Sorbitol–Maltitol–Mannitol–Xylitol", 23 pages, published by Roquette (undated).

*Primary Examiner*—Jeanette Hunter
*Attorney, Agent, or Firm*—Steven P. Shurtz; Brinks Hofer Gilson & Lione

[57] ABSTRACT

Chewing gums containing maltitol and methods of making such gums are disclosed. In one embodiment, the gum comprises about 5% to about 95% gum base, about 0.1% to about 10% flavoring agent and maltitol, the maltitol being the only bulk sweetener. The maltitol provides the gum with unique properties, and the gum may be non-cariogenic. In other embodiments, the maltitol is co-dried with other sweeteners or coevaporated with a plasticizing syrup to produce unique sweetening ingredients and syrups for gum.

16 Claims, No Drawings

CHEWING GUM CONTAINING MALTITOL

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products, such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers. The non-sugar polyols have the advantage of not contributing to dental caries of consumers, as well as being able to be consumed by diabetics.

One such polyol bulking agent is called maltitol. This polyol bulking agent or bulk sweetener is not approved for use in human food products or in chewing gum in the U.S. However, a GRAS affirmation petition for maltitol as a human food ingredient is currently being prepared. Maltitol does not contribute to dental caries, and does not significantly contribute to calories. Thus, this ingredient's use in chewing gum could be a definite improvement.

Chewing gum claimed to have longer lasting sweetness comprising an intense sweetening agent and about 10% to about 40% of a bulk sweetener such as maltitol is disclosed in U.S. Pat. No. 5,110,608.

A sweetening composition containing at least 50% maltitol and its use in chewing gum is disclosed in U.S. Pat. No. 4,959,225.

Chewing gum compositions claimed to have improved physical stability containing 28% to 58% maltitol are disclosed in U.S. Pat. No. 4,933,188.

Foodstuffs, including chewing gum, containing maltitol as a sweetener or fat replacement are disclosed in European Patent Publication No. 0 390 299.

A method of producing sugarless gum containing maltitol is disclosed in Japanese Patent Publication No. 78-127858.

A process for making a sweetener composition containing maltitol and used in chewing gum is disclosed in U.S. Pat. No. 4,556,565.

Low calorie candies made with maltitol as the main component are disclosed in U.S. Pat. No. 4,623,543.

Anhydrous crystals of maltitol and their use in chewing gum are disclosed in U.S. Pat. No. 4,717,765.

Chewing gum with a coating material made from maltitol is disclosed in U.S. Pat. No. 4,840,797.

SUMMARY OF THE INVENTION

The present invention is a method of producing chewing gum with a new bulk sweetener, specifically maltitol, as well as the chewing gum so produced. The bulk sweetener may be added to sucrose-type gum formulations, replacing a small or large quantity of sucrose. The formulation may be a low- or high-moisture formulation containing low or high amounts of moisture-containing syrup. The bulk sweetener, maltitol, may also be used in low- or non-sugar gum formulations replacing sorbitol, mannitol, or other polyols. Non-sugar formulations may include low- or high-moisture, sugar-free chewing gums.

The bulk sweetener, maltitol, may be combined with other bulk sweeteners for use in chewing gum, including but not limited to sucrose, dextrose, fructose, maltose, maltodextrin and xylose, as well as sugar alcohols including but not limited to sorbitol, erythritol, lactitol, mannitol, xylitol, hydrogenated isomaltulose and Lycasin brand hydrogenated starch hydrolysate. The bulk sweetener, maltitol, may be combined in the gum formulation or co-dried or blended with the other bulk sweeteners prior to use in the gum formulation. Co-drying may be done by various methods of spray drying, fluid bed coating, coacervation and other granulating or agglomerating techniques. The bulk sweetener, maltitol, may also be combined with high-intensity sweeteners including, but not limited to, thaumatin, aspartame, acesulfame K, sodium saccharin, glycyrrhizin, alitame, cyclamate, stevioside, sucralose and dihydrochalcones.

This sweetener, maltitol, when used according to the present invention, gives chewing gum an improved texture, an improved shelf life and a unique flavor/sweetness quality. Even though maltitol has some properties like sucrose, it is not cariogenic, and does not significantly contribute to calories, giving a highly consumer-acceptable chewing gum product.

DETAILED DESCRIPTION OF THE PREFERRED EMBODIMENTS

All percentages herein are weight percentages unless otherwise specified. The term "chewing gum" also includes bubble gum and the like.

Maltitol material is obtained by hydrogenation of maltose. Maltitol is obtained by a two stage process involving hydrolyzing starch (corn or potato) and catalytically hydrogenating the resulting maltose under controlled conditions. It is available in the U.S. from Eni Chem USA of New York, N.Y. Maltitol is a polyol that has a sweetness level of about 80–90% of that of sucrose. Maltitol is available as a powder, has good storage stability, and has a melting point of about 147°–150° C. A syrup may be formed at concentrations of 150 g/100 ml and below, the maximum solubility of maltitol at room temperature. At high temperatures, higher concentrations may be used, but maltitol does crystallize readily.

Maltitol may be added to chewing gum in its solid or syrup form. Maltitol may be used in chewing gum as a texture and flavor modifier, bulking agent, and may improve texture, flavor and shelf life properties. Maltitol may replace solids like sucrose, dextrose, lactose, sorbitol or mannitol when used in its powder form, or may replace syrups when used in its liquid or syrup form. At levels of about 0.5% to about 25%, maltitol may replace part of the bulk sweeteners in sugar gum or, as a liquid, all or part of the syrup in sugar gum. At higher levels of about 25% to about 90% of the gum formulation, maltitol may replace all of the bulk sweeteners in a chewing gum formulation.

Unique chewing gum formulations can be obtained when all bulk sweeteners are replaced with maltitol powder and syrup. The relatively low sweetness intensity allows for use of unique flavor combinations, such as the use of savory and snack flavors. High-intensity sweeteners may be added to increase sweetness to obtain more typical chewing gum formulations. Chewing gum formulations with high levels of maltitol would be softer and less hygroscopic than sugar-containing gum formulations. Chewing gum formulations with maltitol may contain a very low amount of moisture in the gum formulation, i.e., below about 2%, or may contain a medium amount of moisture, about 2–5%, and may even be a soft gum formulation containing 5% moisture or more.

Although maltitol has properties like sucrose, and since it is a polyol, it may be used in chewing gum formulations containing non-sugar ingredients. Non-sugar ingredients are polyols such as sorbitol, mannitol, xylitol, hydrogenated isomaltulose, lactitol, erythritol and hydrogenated starch hydrolysate. These polyols are used in a variety of combinations to develop unique sugarless chewing gum formulations. Maltitol may be used to replace the individual polyols or combinations of polyols. With partial replacement of one or more polyols, maltitol can be used at levels of about 0.5–25%. If maltitol replaces a large amount or most of the polyols, this level may be about 25% to about 90% of the gum formulation.

Some sugar-free chewing gum formulations contain high levels of glycerin and are very low in moisture, i.e., less than about 2%. Maltitol, solids or syrup, may replace part or all of the glycerin used in these types of formulations. At higher moisture levels (more than 2%) in sugar-free gum, a liquid sorbitol (70% sorbitol, 30% water) is used. Maltitol solids or maltitol syrup may replace part or all of the sorbitol liquid. Sugar-free syrups like hydrogenated starch hydrolysate (HSH), such as Lycasin brand HSH, may also be replaced in part or totally by maltitol solids or syrup. The same product advantages found with hydrogenated starch hydrolysate syrups, such as improved product shelf life, improved texture and improved aspartame and alitame stability, may also be found with the use of maltitol solids or syrup.

HSH and glycerin are preblended and co-evaporated to reduce moisture in some sugar-free gum formulations. Maltitol solids and/or syrup may be used to replace part or all of the HSH/glycerin blends in chewing gum formulations. Aqueous maltitol syrup may also replace HSH in the preblend with glycerin and be co-evaporated with glycerin to obtain a low moisture, non-crystallizable blend. Combinations of maltitol solids/syrup with polyols like sorbitol, maltitol, xylitol and mannitol in aqueous form may also be blended with glycerin and co-evaporated for use in low-moisture, sugar-free gum.

In a similar manner, maltitol solids/syrup preblended in glycerin and co-evaporated may be used in conventional sugar chewing gum formulations. Maltitol may be combined with sugars like dextrose, sucrose, lactose, maltose, invert sugar, fructose and corn syrup solids to form a liquid mix to be blended with glycerin and co-evaporated. Maltitol solids/syrup may also be mixed with conventional syrup and blended with glycerin and co-evaporated for use in a sugar chewing gum formulation.

Maltitol bulk sweetener may be co-dried with a variety of sugars such as sucrose, dextrose, lactose, fructose and corn syrup solids, and used in a sugar-containing gum formulation. Maltitol may also be co-dried with a variety of other polyols, such as sorbitol, mannitol, xylitol, lactitol, hydrogenated isomaltulose, erythritol and hydrogenated starch hydrolysate, and used in a sugar-free gum formulation. Co-drying refers to methods of co-crystallization and co-precipitation of maltitol with sugars and other polyols, as well as co-drying by encapsulation, agglomeration and absorption with other sugars and polyols.

Co-drying by encapsulation, agglomeration and absorption can also include the use of encapsulating and agglomerating agents. Maltitol may be mixed with sugars or other polyols prior to being redried by encapsulation or agglomeration, or may be used alone with the encapsulating and agglomerating agents. These agents modify the physical properties of the bulk sweetener and control its release from chewing gum. Since maltitol is highly soluble in water as noted earlier, controlling the release of maltitol modifies the texture and flavor of the chewing gum.

Physical modifications of the bulk sweetener by encapsulation with another substrate will slow its release in chewing gum by reducing the solubility or dissolution rate. Any standard technique which gives partial or full encapsulation of the bulk sweetener can be used. These techniques include, but are not limited to, spray drying, spray chilling, fluid-bed coating and coacervation. These encapsulation techniques that give partial encapsulation or full encapsulation can be used individually or in any combination in a single step process or multiple step process. Generally, delayed release of bulk sweetener is obtained in multistep processes like spray drying the bulk sweetener and then fluid-bed coating the resultant powder.

The encapsulation techniques here described are standard coating techniques and generally give varying degrees of coating from partial to full coating, depending on the coating composition used in the process. Also, the coating compositions may be susceptible to water permeation to various degrees. Generally, compositions that have high organic solubility, good film-forming properties and low water solubility give better delayed release of the bulk sweetener. Such compositions include acrylic polymers and copolymers, carboxyvinyl polymer, polyamides, polystyrene, polyvinyl acetate, polyvinyl acetate phthalate, polyvinyl pyrrolidone, and waxes. Although all of these materials are possible for encapsulation of the bulk sweetener, only food-grade material should be considered. Two standard food-grade coating materials that are good film formers but not water-soluble are shellac and Zein. Others which are more water soluble, but good film formers, are materials like agar, alginates, a wide range of cellulose derivatives like ethyl cellulose, methyl cellulose, sodium hydroxymethyl cellulose and hydroxypropylmethyl cellulose, dextrin, gelatin, and modified starches. These ingredients, which are generally approved for food use, also give a delayed release when used as an encapsulant. Other encapsulants, like acacia or maltodextrin, can also encapsulate maltitol, but may increase the release rate of the bulk sweetener.

The amount of coating or encapsulating material on the bulk sweetener also controls the length of time for its release from chewing gum. Generally, the higher the level of coating, the slower the release of the bulk sweetener during mastication. The release rate is generally not instantaneous, but gradual over an extended period of time.

Another method of giving a delayed release of the bulk sweetener is agglomeration of the bulk sweetener with an agglomerating agent which partially coats the bulk sweetener. This method includes the step of mixing the bulk sweetener and agglomerating agent with a small amount of water or solvent. The mixture is prepared in such a way as to have individual wet particles in contact with each other so that a partial coating can be applied. After the water or solvent is removed, the mixture is ground and used as a powdered, coated bulk sweetener.

Materials that can be used as the agglomerating agent are the same as those used in encapsulation mentioned previously. However, since the coating is only a partial encapsulation and the bulk sweetener is water soluble, some agglomerating agents are more effective in delaying the sweetener release than others. Some of the better agglomerating agents are the organic polymers like acrylic polymers and copolymers, polyvinyl acetate, polyvinyl pyrrolidone, waxes, shellac and Zein. Other agglomerating agents are not as effective in giving the bulk sweetener a delayed release as are the polymers, waxes, shellac and Zein, but can be used to give some delayed release. These other agglomerating agents include, but are not limited to, agar, alginates, a wide range of cellulose derivatives like ethyl cellulose, methyl cellulose, sodium hydroxymethyl cellulose and hydroxypropylmethyl cellulose, dextrin, gelatin, modified starches, and vegetable gums like guar gum, locust bean gum, and carrageenin. Even though the agglomerated bulk sweetener is only partially coated, when the quantity of coating is increased compared to the quantity of the bulk sweetener, the release of the bulk sweetener can be delayed for a longer time during mastication.

The bulk sweetener may be coated in a two-step process or multiple-step process. The bulk sweetener may be encapsulated with any of the materials as described previously and then the encapsulated sweetener can be agglomerated as described previously to obtain an encapsulated/agglomerated/bulk sweetener product that could be used in chewing gum to give a delayed release of bulk sweetener.

In another embodiment of this invention, maltitol sweetener may be absorbed onto another component which is porous and becomes entrapped in the matrix of the porous component. Common materials used for absorbing the bulk sweetener include, but are not limited to, silicas, silicates, pharmasorb clay, sponge-like beads or microbeads, amorphous sugars like spray-dried dextrose, sucrose, polyols, amorphous carbonates and hydroxides, including aluminum and calcium lakes, vegetable gums and other spray dried materials.

Depending on the type of absorbent material and how it is prepared, the amount of bulk sweetener that can be loaded onto the absorbent will vary. Generally materials like polymers, sponge-like beads or microbeads, amorphous sugars and polyols and amorphous carbonates and hydroxides absorb about 40% to about 60% of the weight of the absorbent. Other materials like silica and pharmasorb clays may be able to absorb about 20% to about 80% of the weight of the absorbent.

The general procedure for absorbing the bulk sweetener onto the absorbent is as follows. An absorbent like fumed silica powder can be mixed in a powder blender and an aqueous solution of the bulk sweetener can be sprayed onto the powder as mixing continues. The aqueous solution can be about 40% to 60% solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and ground to a specific particle size.

After the bulk sweetener is absorbed onto an absorbent or fixed onto an absorbent, the fixative/sweetener can be coated by encapsulation. Either full or partial encapsulation may be used, depending on the coating composition used in the process. Full encapsulation may be obtained by coating with a polymer as in spray drying, spray chilling, fluid-bed coating, coacervation, or any other standard technique. A partial encapsulation or coating can be obtained by agglomeration off the fixative/sweetener mixture using any of the materials discussed above.

The three methods of use to obtain a delayed release of bulk sweetener are: (1) encapsulation by spray drying, fluid-bed coating, spray chilling and coacervation to give full or partial encapsulation, (2) agglomeration to give partial encapsulation and (3) fixation or entrapment/absorption, which also gives partial encapsulation. These three methods, combined in any usable manner which physically isolates the bulk sweetener, reduces its dissolvability or slows down the release of bulk sweetener, are included in this invention.

Maltitol may be used with other bulk sweeteners and in combinations that give unique properties. Maltitol may be co-dried by various delayed release methods noted above with other bulk sweeteners like isomaltulose, sucrose, dextrose, lactose, maltose, fructose, corn syrup solids, sorbitol, mannitol, xylitol, maltitol, hydrogenated isomaltulose, erythritol and hydrogenated starch hydrolysate for use in sugar and sugar-free chewing gum.

Other methods of treating the maltitol bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using maltitol bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the maltitol bulk sweetener from other chewing gum ingredients is to add maltitol to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises maltitol bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of the chewing gum composition. The amount of maltitol bulk sweetener added to the rolling compound is about 0.05% to 100% of the rolling compound, or about 0.005% to about 5% of the chewing gum composition. This method of using maltitol bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

Another method of isolating maltitol bulk sweetener is to use it in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique, sugar-coated pellet gum. The bulk sweetener is very stable and highly water soluble, and can be easily added to a sugar solution prepared for sugar panning. Maltitol may be combined with sucrose, or used alone in solution as the coating on pellet gum. Maltitol can also be added as a powder blended with other powders often used in some types of conventional panning procedures. Using maltitol sweetener isolates the sweetener from other gum ingredients and modifies its release rate in chewing gum. Levels of use of maltitol may be about 1% to about 100% in the coating and about 0.5% to about 50% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Maltitol also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the maltitol sweetener to yield unique product characteristics.

The previously described encapsulated, agglomerated or absorbed maltitol bulk sweetener may readily be incorporated into a chewing gum composition. The remainder of the chewing gum ingredients are noncritical to the present invention. That is, the coated particles of bulk sweetener can be incorporated into conventional chewing gum formulations in a conventional manner. The maltitol bulk sweeteners may be used in a sugar-free or sugar chewing gum to modify the sweetness thereof. The coated bulk sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers.

Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, isobutylene-isoprene copolymer and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Low melting point waxes may be considered to be plasticizers. High melting point waxes may be considered as bodying agents or textural modifiers.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Emulsifiers, which also sometimes have plasticizing properties, include glycerol monostearate, lecithin and glycerol triacetate. Further, gum bases may also contain optional ingredients such as antioxidants, colors and flavors. The present invention contemplates employing any commercially acceptable gum base.

According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The water-soluble portion of the chewing gum may further comprise softeners, sweeteners, flavoring agents and combinations thereof. The sweeteners often fulfill the role of bulking agents in the gum. The bulking agents typically comprise about 5% to about 90% of the gum composition. Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the maltitol solids/syrup bulk sweetener of the present invention will most likely be used in sugar-free gum formulations. However, sugar formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The maltitol solids/syrup bulk sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, lactitol, hydrogenated starch hydrolysate, erythritol and the like, alone or in any combination.

Depending on the particular sweetness release profile and shelf-stability needed, the maltitol solid/syrup bulk sweeteners of the present invention can also be used in combination with coated or uncoated high-intensity sweeteners or with high-intensity sweeteners coated with other materials and by other techniques.

A flavoring agent may be present in the chewing gum in an amount within the range of from about 0.1 to about 10.0 weight percent, and preferably from about 0.5 to about 3.0 weight percent of the gum. The flavoring agents may comprise essential oils, synthetic flavors or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which maltitol can be added to gum after it is dissolved in water and mixed with various aqueous solvents.

TABLE 1

|  | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.6 | 47.0 |
| BASE | 19.2 | 19.2 | 19.2 | 19.2 | 19.2 | 19.2 | 19.2 | 19.2 |
| CORN SYRUP | 12.9 | 1.9 | 8.9 | 2.9 | 6.9 | 6.9 | 0.0 | 2.9 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| MALTITOL/ LIQUID BLEND | 10.0 | 20.0 | 14.0 | 30.0 | 20.0 | 20.0 | 22.9 | 30.0 |

Example 1

Maltitol powder can be added directly to the gum.

Example 2

An 80 gram portion of maltitol can be dissolved in 120 grams of water at 40° C., making a 40% solution, and added to gum.

Example 3

Maltitol syrup at 58% solids can be added directly to the gum.

Example 4

A blend of 80 grams of maltitol and 120 grams of water is mixed at 40° C. To this is added 100 grams of glycerin to give a mixture of 27% maltitol, 40% water and 33% glycerin, and added to gum.

Example 5

To 140 grams of maltitol syrup at 58% solids is added 60 grams of glycerin to give a 70% maltitol syrup with 30% glycerin, and added to gum.

Example 6

To 140 grams of maltitol syrup of 58% solids is added 60 grams of propylene glycol, giving a 70% maltitol syrup with 30% propylene glycol, and added to gum.

Example 7

To 140 grams of maltitol syrup at 58% solids is added 89 grams of corn syrup and blended, giving a mixture of 61% maltitol syrup and 39% corn syrup.

Example 8

To a 200 gram quantity of corn syrup is added 100 grams of glycerin. To this mixture is added 75 grams of maltitol and blended at 50° C. This mixture is added to gum.

In the next examples of sugar gum formulations, maltitol can be dissolved in water and emulsifiers can be added to the aqueous solution. Example solutions can be prepared by dissolving 15 grams of maltitol in 70 grams water and adding 15 grams of emulsifiers of various hydrophilic-lipophilic balance (HLB) values to the solution. The mixtures can then be used in the following formulas. (Note: The aqueous solution of Example 9 does not use any emulsifier.)

TABLE 2

|  | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.9 | 12.9 | 12.9 | 12.9 | 12.9 | 12.9 |

TABLE 2-continued

|  | EX. 9 | EX. 10 | EX. 11 | EX. 12 | EX. 13 | EX. 14 |
|---|---|---|---|---|---|---|
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| BULK SWEETENER/ EMULSIFIER/WATER MIXTURE | 5.0 | 5.0 | 5.0 | 5.0 | 5.0 | 5.0 |
| Emulsifier | None | HLB = 2 | HLB = 4 | HLB = 6 | HLB = 9 | HLB = 12 |

Examples 15–20

Examples 15–20 are the same as the formulations made in Examples 9–14, respectively, except that the flavor can be mixed together with the aqueous bulk sweetener solution before adding the mixture to the gum batch.

Maltitol bulk sweetener can also be blended into various base ingredients. A typical base formula is as follows:

|  | WEIGHT PERCENT |
|---|---|
| Polyvinyl acetate | 27 |
| Synthetic rubber | 13 |
| Paraffin wax | 13 |
| Fat | 3 |
| Glycerol monostearate | 5 |
| Terpene resin | 27 |
| Calcium carbonate filler | 12 |
|  | 100% |

The individual base components can be softened prior to their addition in the base manufacturing process. To the presoftened base component, maltitol can be added and mixed, and then the presoftened base/bulk sweetener blend can be added to make the finished base. In the following examples, maltitol can be mixed first with one of the base ingredients, and the mixed ingredient can then be used in making a base. The ingredients blended with maltitol can then be used at levels indicated in the typical base formula above.

Example 21

The terpene resin used to make the base is 80% polyterpene resin and 20% maltitol.

Example 22

The polyvinyl acetate used to make the base is 80% low M.W. polyvinyl acetate and 20% maltitol.

Maltitol may also be added to an otherwise complete gum base.

Example 23

Maltitol can be mixed with a gum base having the above listed typical formula, at a rate of 5% maltitol and 95% gum base. The maltitol can be added near the end of the process, after all the other ingredients are added.

The samples of finished base made with maltitol added to different base components can then be evaluated in a sugar-type chewing gum formulated as follows:

TABLE 3

(For examples 21, 22, and 23)

| Sugar | 55.2 |
|---|---|
| Base | 19.2 |
| Corn syrup | 13.4 |
| Glycerine | 1.4 |
| Dextrose monohydrate | 9.9 |
| Peppermint flavor | 0.9 |
|  | 100% |

The theoretical level of maltitol bulk sweetener is 1% in the finished gum.

The following Tables 4 through 11 give examples of gum formulations demonstrating formula variations in which maltitol, in the form of maltitol powder or maltitol syrup, may be used.

Examples 24–28 in Table 4 demonstrate the use of maltitol in low-moisture sugar formulations having less than 2% theoretical moisture.

TABLE 4

|  | EX. 24 | EX. 25 | EX. 26 | EX. 27 | EX. 28 |
|---|---|---|---|---|---|
| SUGAR | 57.9 | 53.9 | 48.9 | 25.0 | 0.0 |
| GUM BASE | 19.2 | 19.2 | 19.2 | 19.2 | 19.2 |
| CORN SYRUP[a] | 6.0 | 6.0 | 6.0 | 6.0 | 6.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 5.0 | 8.9 | 8.9 |
| FLAVOR | 0.9 | 0.9 | 0.9 | 0.9 | 0.9 |
| MALTITOL | 1.0 | 5.0 | 10.0 | 25.0 | 50.0 |

[a]Corn syrup is evaporated to 85% solids, 15% moisture
[b]Glycerin and syrup may be blended and co-evaporated Examples 29–33 in Table 5 demonstrate the use of maltitol in medium-moisture sugar formulations having about 2% to about 5% moisture.

TABLE 5

|  | EX. 29 | EX. 30 | EX. 31 | EX. 32 | EX. 33 |
|---|---|---|---|---|---|
| SUGAR | 52.5 | 48.5 | 43.5 | 25.0 | 0.0 |
| GUM BASE | 19.2 | 19.2 | 19.2 | 19.2 | 19.2 |
| CORN SYRUP[a] | 15.0 | 15.0 | 15.0 | 18.5 | 18.5 |
| DEXTROSE MONOHYDRATE | 10.0 | 10.0 | 10.0 | 10.0 | 10.0 |
| GLYCERIN[b] | 1.4 | 1.4 | 1.4 | 1.4 | 1.4 |

TABLE 5-continued

|  | EX. 29 | EX. 30 | EX. 31 | EX. 32 | EX. 33 |
|---|---|---|---|---|---|
| FLAVOR | 0.9 | 0.9 | 0.9 | 0.9 | 0.9 |
| MALTITOL | 1.0 | 5.0 | 10.0 | 25.0 | 50.0 |

*Corn syrup is evaporated to 85% solids, 15% moisture
[b]Glycerin and syrup may be blended and co-evaporated Examples 34–38 in Table 6 demonstrate the use of maltitol in high-moisture sugar formulations having more than about 5% moisture.

TABLE 6

|  | EX. 34 | EX. 35 | EX. 36 | EX. 37 | EX. 38 |
|---|---|---|---|---|---|
| SUGAR | 50.0 | 46.0 | 41.0 | 25.0 | 0.0 |
| GUM BASE | 24.0 | 24.0 | 24.0 | 24.0 | 24.0 |
| CORN SYRUP | 24.0 | 24.0 | 24.0 | 24.6 | 24.6 |
| GLYCERIN | 0.0 | 0.0 | 0.0 | 0.4 | 0.4 |
| FLAVOR | 1.0 | 1.0 | 1.0 | 1.0 | 1.0 |
| MALTITOL | 1.0 | 5.0 | 10.0 | 25.0 | 50.0 |

Examples 39–43 in Table 7 and Examples 44–53 in Tables 8 and 9 demonstrate the use of maltitol in low- and high-moisture gums that are sugar-free. Low-moisture gums have less than about 2% moisture, and high-moisture gums have greater than 2% moisture.

TABLE 7

|  | EX. 39 | EX. 40 | EX. 41 | EX. 42 | EX. 43 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 10.0 | 10.0 | 10.0 | 10.0 |
| FLAVOR | 1.5 | 1.5 | 1.5 | 1.5 | 1.5 |
| MALTITOL | 1.0 | 5.0 | 10.0 | 25.0 | 50.0 |

TABLE 8

|  | EX. 44 | EX. 45 | EX. 46 | EX. 47 | EX. 48 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| SORBITOL LIQUID* | 10.0 | 10.0 | 10.0 | 10.0 | 11.0 |
| MANNITOL | 10.0 | 10.0 | 10.0 | 10.0 | 10.0 |
| GLYCERIN | 2.0 | 2.0 | 2.0 | 2.0 | 2.0 |
| FLAVOR | 1.5 | 1.5 | 1.5 | 1.5 | 1.5 |
| MALTITOL | 1.0 | 5.0 | 10.0 | 25.0 | 50.0 |

*Sorbitol liquid contains 70% sorbitol, 30% water

TABLE 9

|  | EX. 49 | EX. 50 | EX. 51 | EX. 52 | EX. 53 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 8.0 | 8.0 | 8.0 | 9.0 |
| GLYCERIN** | 4.0 | 4.0 | 4.0 | 4.0 | 4.0 |
| FLAVOR | 1.5 | 1.5 | 1.5 | 1.5 | 1.5 |
| MALTITOL | 1.0 | 5.0 | 10.0 | 25.0 | 50.0 |

*Lycasin brand hydrogenated starch hydrolysate syrup
**Glycerin and HSH syrup may be blended or co-evaporated Table 10 shows sugar chewing gum formulations that can be made with maltitol and various types of sugars.

TABLE 10

|  | EX. 54 | EX. 55 | EX. 56 | EX. 57 | EX. 58 | EX. 59 |
|---|---|---|---|---|---|---|
| GUM BASE | 19.2 | 19.2 | 19.2 | 19.2 | 19.2 | 19.2 |
| SUCROSE | 44.5 | 24.5 | 39.5 | 19.5 | 29.5 | 19.5 |
| GLYCERIN | 1.4 | 1.4 | 1.4 | 1.4 | 1.4 | 1.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| MALTITOL | 5.0 | 25.0 | 5.0 | 25.0 | 5.0 | 25.0 |

|  | EX. 60 | EX. 61 | EX. 62 | EX. 63 | EX. 64 | EX. 65 |
|---|---|---|---|---|---|---|
| GUM BASE | 19.2 | 19.2 | 19.2 | 19.2 | 19.2 | 19.2 |
| SUCROSE | 29.5 | 19.5 | 29.5 | 19.5 | 37.5 | 22.5 |
| GLYCERIN | 1.4 | 1.4 | 1.4 | 1.4 | 1.4 | 1.4 |
| CORN SYRUP | 14.0 | 14.0 | 14.0 | 14.0 | 11.0 | 11.0 |
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| MALTITOL | 5.0 | 25.0 | 5.0 | 25.0 | 5.0 | 25.0 |

Any of the sugars may be combined with maltitol and co-dried to form unique combinations such as:

Example 66

Dextrose and maltitol can be dissolved in water in a 2:1 ratio dextrose:maltitol and co-dried or co-precipitated and used in the formulas in Table 10.

Example 67

Maltitol and sucrose can be dissolved in water in a 1:1 ratio and co-dried or co-precipitated and used in the formulas in Table 10.

Example 68

Maltitol, sucrose and dextrose can be dissolved in water in a 1:1:1 ratio and co-dried or co-precipitated and used in the formulas in Table 10.

Example 69

Maltitol, sucrose, dextrose and fructose can be dissolved in water at 25% of each ingredient and co-dried and used in the formulas in Table 10.

Example 70

Maltitol, dextrose, fructose and lactose can be dissolved in water at 25% of each ingredient and co-dried and used in the formulas in Table 10.

Example 71

Maltitol, dextrose, maltose and corn syrup solids can be dissolved in water at 25% of each ingredient and co-dried and used in the formulas in Table 10.

Example 72

Maltitol, sucrose, dextrose, maltose and fructose can be dissolved in water at 20% of each ingredient and co-dried and used in the formulas in Table 10.

Multiple combinations of maltitol with sugars can be made in solution to form liquid concentrates that do not need to be co-dried, such as:

Example 73

Maltitol, corn syrup and glycerin can be dissolved in water at a ratio of 1:1:1, evaporated to a thick syrup and used in the formulas in Table 10.

Example 74

Maltitol, dextrose, fructose and invert sugar may be dissolved in water at 25% of each ingredient and evaporated to a thick syrup and used in the formulas in Table 10.

Example 75

Maltitol, dextrose, maltose and corn syrup solids may be dissolved in water at 25% of each component and evaporated to a thick syrup and used in the formulas in Table 10.

Example 76

Glycerin is added to Example 74 at a ratio of 4:1 syrup to glycerin and evaporated to a thick syrup and used in the formulas in Table 10.

Example 77

Glycerin is added to Example 75 at a ratio of 2:1 syrup to glycerin and evaporated to a thick syrup and used in the formulas in Table 10.

Multiple combinations of two or three sweeteners can also be made by melting a sugar and maltitol at about 160° C., blending, cooling and grinding to form powder blends such as:

Example 78

Dextrose and maltitol are melted at 160° C. and blended at a ratio of 1:1, cooled, ground and used in formulas in Table 10.

Example 79

Dextrose, fructose and maltitol at a ratio of 1:1:1 are blended and melted at 160° C. The melted blend is then mixed, cooled, ground and used in formulas in Table 10.

Table 11 shows chewing gum formulations that are free of sugar. These formulations can use a wide variety of other non-sugar polyols.

TABLE 11

| | EX. 80 | EX. 81 | EX. 82 | EX. 83 | EX. 84 | EX. 85 |
|---|---|---|---|---|---|---|
| GUM BASE | 25.5 | 25.5 | 25.5 | 25.5 | 25.5 | 25.5 |
| GLYCERIN | 2.0 | 2.0 | 2.0 | 2.0 | 2.0 | 2.0 |
| SORBITOL | 44.0 | 34.0 | 34.0 | 29.0 | 28.0 | — |
| MANNITOL | — | 10.0 | 10.0 | 10.0 | 10.0 | 6.0 |
| SORBITOL LIQUID | 17.0 | 17.0 | — | — | — | — |
| LYCASIN HSH SYRUP | — | — | 17.0 | 12.0 | 8.0 | 10.0 |
| LACTITOL | — | — | — | 10.0 | — | — |
| XYLITOL | — | — | — | — | 15.0 | 15.0 |
| HYDROGENATED ISOMALTULOSE | — | — | — | — | — | — |
| FLAVOR | 1.5 | 1.5 | 1.5 | 1.5 | 1.5 | 1.5 |
| MALTITOL | 10.0 | 10.0 | 10.0 | 10.0 | 10.0 | 40.0 |

| | EX. 86 | EX. 87 | EX. 88 | EX. 89 | EX. 90 | EX. 91 |
|---|---|---|---|---|---|---|
| GUM BASE | 25.5 | 25.5 | 25.5 | 25.5 | 25.5 | 25.5 |
| GLYCERIN | 8.0 | 8.0 | 8.0 | 2.0 | 3.0 | 2.0 |
| SORBITOL | 32.0 | 27.0 | 22.0 | 31.0 | 10.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| LACTITOL | — | 5.0 | — | — | — | — |
| XYLITOL | — | — | — | 15.0 | — | — |
| HYDROGENATED ISOMALTULOSE | — | — | 10.0 | 10.0 | 25.0 | 21.0 |
| FLAVOR | 1.5 | 1.5 | 1.5 | 1.5 | 1.5 | 1.5 |
| MALTITOL | 20.0 | 20.0 | 20.0 | 10.0 | 25.0 | 40.0 |

Any of the polyols can be combined with maltitol and co-dried to form unique combinations, such as:

Example 92

Maltitol and sorbitol can be dissolved in water in a ratio of 2:1 sorbitol:maltitol, co-dried, and used in formulas in Table 11.

Example 93

Maltitol, sorbitol and mannitol can be dissolved in water at a ratio of 1:1:1, co-dried, and used in appropriate formulas in Table 11.

Example 94

Maltitol, mannitol and xylitol can be dissolved in water at a ratio of 1:1:1, co-dried, and used in appropriate formulas in Table 11.

Example 95

Maltitol, hydrogenated isomaltulose and sorbitol can be dissolved in water at a ratio of 1:1:1, co-dried, and used in appropriate formulas in Table 11.

Example 96

Maltitol and hydrogenated isomaltulose can be dissolved in water at a ratio of 1:1, co-dried, and used in appropriate formulas in Table 11.

Example 97

Maltitol, sorbitol, maltitol and xylitol may be blended at 25% of each ingredient and dissolved in water, co-dried, and used in appropriate formulas in Table 11.

Multiple combinations of maltitol with the various polyols can be made in solution to form liquid concentrates that do not need to be co-dried, such as:

Example 98

Maltitol, sorbitol, maltitol and Lycasin HSH syrup may be dissolved in water at 25% of each ingredient, evaporated to a thick syrup and used in the appropriate formulas in Table 11.

Example 99

Maltitol, xylitol, sorbitol and Lycasin HSH syrup can be dissolved in water at 25% of each ingredient, evaporated to a thick syrup, and used in the formulas in Table 11.

Example 100

Maltitol, sorbitol and Lycasin HSH syrup can be dissolved in water at 1:1:1 ratio of each ingredient, evaporated to a thick syrup, and used in the formulas in Table 11.

Example 101

Maltitol, Lycasin HSH syrup and glycerin can be dissolved in water at a ratio of 1:1:1, evaporated to a thick syrup and used in the formulas in Table 11.

Example 102

Glycerin is added to Example 98 at a ratio of 4:1 syrup to glycerin, evaporated to a thick syrup and used in formulas in Table 11.

Example 103

Glycerin is added to Example 99 at a ratio of 4:1 syrup to glycerin, evaporated to a thick syrup and used in the formulas in Table 11.

Example 104

Glycerin is added to Example 100 at a ratio of 4:1 syrup to glycerin, evaporated to a thick syrup and used in formulas in Table 11.

Multiple combinations of one or two polyols with maltitol can be made by melting the polyols together at about 160° C., cooling and grinding to form powder blends, such as:

Example 105

Sorbitol and maltitol are melted at 160° C., blended at a 1:1 ratio, cooled, ground and used in formulas in Table 11.

Example 106

Sorbitol, xylitol and maltitol are blended at a 1:1:1 ratio and melted at 160° C. The blend is cooled, ground and used in formulas in Table 11.

High-intensity sweeteners such as aspartame, acesulfame K, or the salts of acesulfame, cyclamate and its salts, saccharin and its salts, alitame, sucralose, thaumatin, monellin, dihydrochalcones, stevioside, glycyrrhizin, and combinations thereof may be used in any of the Examples listed in Tables 4, 5, 6, 7, 8, 9, 10 and 11. Since maltitol has less sweetness than some of the sugars used in sugar gum, and some of the polyols in sugar-free gum, a high-intensity sweetener may be needed to obtain the proper level of sweetness.

High-intensity sweeteners may also be modified to control their release in chewing gum formulations containing maltitol. This can be controlled by various methods of encapsulation, agglomeration, absorption, or a combination of methods to obtain either a fast or slow release of the sweetener. Sweetener combinations, some of which may be synergistic, may also be included in the gum formulations containing maltitol.

The following examples show the use of high-intensity sweeteners in chewing gum formulations with maltitol.

Example 107

Aspartame at a level of 0.2% may be added to any of the formulas in Tables 4 through 11 by replacing 0.2% of the maltitol.

Example 108

Alitame at a level of 0.03% may be added to any of the formulas in Tables 4 through 11 by replacing 0.03% of the maltitol.

Example 109

Sucralose at a level of 0.07% may be added to any of the formulas in Tables 4 through 11 by replacing 0.07% of the maltitol.

Example 110

Thaumatin at a level of 0.02% may be added to any of the formulas in Tables 4 through 11 by replacing 0.02% of the maltitol.

Example 111

Glycyrrhizin at a level of 0.4% may be added to any of the formulas in Tables 4 through 11 by replacing 0.4% of the maltitol.

High-intensity sweeteners may also be combined with other high-intensity sweeteners, with or without encapsulation, agglomeration or absorption, and used in chewing gums of the present invention. Examples are:

Example 112

Aspartame and acesulfame K at a 1:1 ratio may be added to any of the formulas in Tables 4 through 11 at a level of 0.15% by replacing 0.15% of the maltitol.

Example 113

Aspartame and alitame at a ratio of 9:1 aspartame: alitame may be added to any of the formulas in Tables 4 through 11 at a level of 0.2% by replacing 0.2% of the maltitol.

Example 114

Aspartame and thaumatin at a ratio of 9:1 aspartame:thaumatin can be added to any of the formulas in Tables 4 through 11 at a level of 0.2% by replacing 0.2% of the maltitol.

Example 115

Sucralose and alitame in a ratio of 3:1 sucralose:alitame can be added to any of the formulas in Tables 4 through 11 at a level of 0.1% by replacing 0.1% of the maltitol.

Example 116

Alitame and glycyrrhizin in a ratio of 1:12 alitame:glycyrrhizin can be added to any of the formulas in Tables 4 through 11 at a level of 0.1% by replacing 0.1% of the maltitol.

Example 117

Aspartame and glycyrrhizin in a ratio of 1:14 aspartame:glycyrrhizin can be added to any of the formulas in Tables 4 through 11 at a level of 0.3% by replacing 0.3% of the maltitol.

As discussed above, the various types of maltitol ingredients that are available are maltitol powder and syrup. These materials may be used as the exclusive bulking agent and/or sweetener in a variety of chewing gum formulations, as in Tables 12 and 13.

TABLE 12

|  | EX. 118 | EX. 119 | EX. 120 | EX. 121 | EX. 122 |
|---|---|---|---|---|---|
| GUM BASE | 19.2 | 30.5 | 35.5 | 30.5 | 30.0 |
| GLYCERIN | 2.0 | 2.0 | 7.0 | 7.0 | 2.0 |
| MALTITOL POWDER* | 67.8 | 56.0 | 51.0 | 46.0 | 45.5 |
| MALTITOL SYRUP* | 10.0 | 10.0 | 5.0 | 15.0 | 20.0 |
| FLAVOR | 1.0 | 1.5 | 1.5 | 1.5 | 2.5 |

*Maltitol powder and maltitol syrup may also be preblended with glycerin and coevaporated to reduce moisture.

TABLE 13

|  | EX. 123 | EX. 124 | EX. 125 | EX. 126 | EX. 127 | EX. 128 |
|---|---|---|---|---|---|---|
| GUM BASE | 25.5 | 25.5 | 25.5 | 25.5 | 50.0 | 70.0 |
| GLYCERIN | 2.0 | 2.0 | 7.0 | 15.0 | 2.0 | 1.0 |
| MALTITOL POWDER | 51.0 | 61.0 | 51.0 | 43.0 | 45.5 | 24.0 |
| MALTITOL SYRUP | 20.0 | 10.0 | 15.0 | 15.0 | — | 2.0 |
| FLAVOR | 1.5 | 1.5 | 1.5 | 1.5 | 2.5 | 3.0 |

The formulations in Tables 12 and 13 do not contain sugars or other polyols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame K and saccharin. The formulations in Tables 12 and 13 without the sugars and other types of polyols will also have good non-cariogenic and low caloric properties.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

We claim:

1. A method of making chewing gum comprising the steps of:
   a) coevaporating an aqueous solution comprising
      i) a polyol consisting of maltitol, and
      ii) a sugar sweetener to form a syrup, and
   b) mixing the syrup with gum base, bulking agents and flavoring agents to produce a chewing gum composition.

2. A method of making chewing gum comprising the steps of:
   a) co-drying a solution containing maltitol and another sweetener selected from the group consisting of sugar sweeteners, and
   b) mixing the co-dried maltitol/sweetener with gum base and flavoring agents to produce a chewing gum composition.

3. The method of claim 1 wherein the gum composition further comprises a sweetening amount of aspartame.

4. The method of claim 1 wherein the aqueous solution further comprises a plasticizing agent.

5. The method of claim 4 wherein the plasticizing agent is selected from the group consisting of glycerin, propylene glycol and mixtures thereof.

6. The method of claim 1 wherein the sugar sweetener is selected from the group consisting of dextrose, sucrose, lactose, maltose, invert sugar, fructose, corn syrup solids and mixtures thereof.

7. A method of making chewing gum comprising the steps of:
   a) coevaporating an aqueous solution consisting essentially of water, maltitol, one or more sweeteners selected from the group consisting of sorbitol, mannitol, xylitol, lactitol, hydrogenerated isomaltulose, erythritol, sugar sweeteners and high-intensity sweeteners, and optionally a plasticizing agent, to form a syrup, and
   b) mixing the syrup with gum base, bulking agents and flavoring agents to produce a chewing gum composition.

8. The method of claim 2 wherein the solution consists of maltitol and one or more sugar sweeteners.

9. The method of claim 7 wherein the aqueous syrup comprises a plasticizing agent.

10. The method of claim 2 wherein the step of co-drying comprises co-crystallization.

11. A method of making chewing gum comprising the steps of:
   a) co-crystallizing maltitol and another sweetener selected from the group consisting of sugar sweeteners and polyol sweeteners that are co-crystallizable with maltitol, and
   b) mixing the co-crystallized maltitol/sweetener with gum base and flavoring agents to produce a chewing gum composition.

12. The method of claim 11 wherein the step of co-crystallization is preformed by melting and blending the maltitol and other sweetener and cooling the melted blend.

13. The method of claim 11 wherein the other sweetener is selected from the group consisting of xylitol and erythritol.

14. A method of making chewing gum comprising the steps of:
   a) co-drying a solution containing maltitol and another sweetener selected from the group consisting of sugar sweeteners and high-intensity sweeteners,
   b) encapsulating the co-dried maltitol/sweetener with an encapsulation material, and
   c) mixing the encapsulated co-dried maltitol/sweetener with gum base and flavoring agents to produce a chewing gum composition.

15. The method of claim 14 wherein the other sweetener is a high-intensity sweetener.

16. The method of claim 14 wherein the encapsulating material comprises polyvinyl acetate.

* * * * *

UNITED STATES PATENT AND TRADEMARK OFFICE
CERTIFICATE OF CORRECTION

PATENT NO. : 5,637,334
DATED : June 10, 1997
INVENTOR(S) : Robert J. Yatka et al.

It is certified that error appears in the above-identified patent and that said Letters Patent is hereby corrected as shown below:

In column 5, line 66, replace "off" with --of--.

Signed and Sealed this

Twenty-seventh Day of June, 2000

Attest:

Q. TODD DICKINSON

*Attesting Officer*      *Director of Patents and Trademarks*